H. R. HARDENBURG & F. SAGER.
POWER JACK.
APPLICATION FILED SEPT. 25, 1908.
927,407.
Patented July 6, 1909.
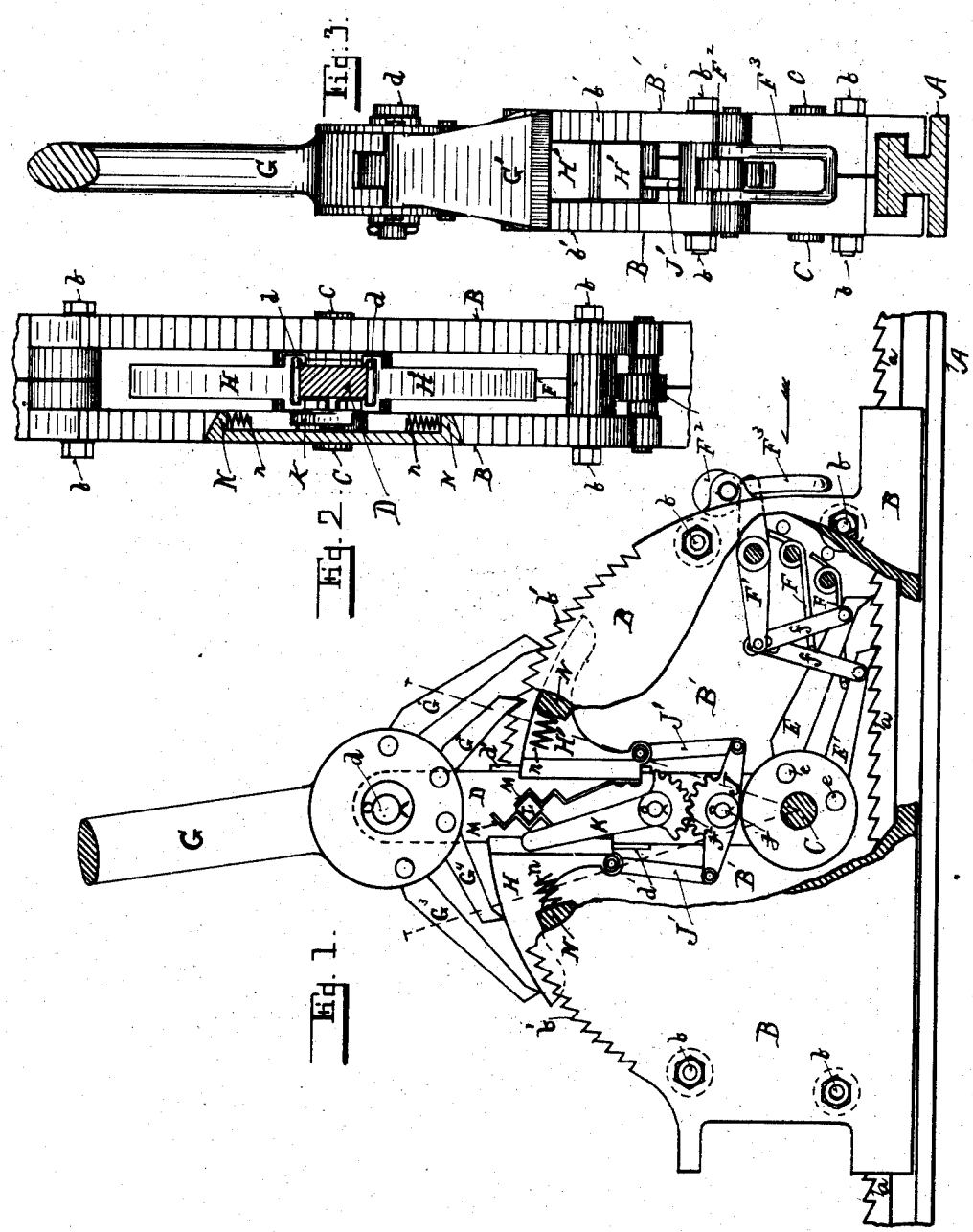
Witnesses.
G. J. Mead
Florence Stockert
Inventors.
Howard R. Hardenburg,
Fredrick Sager,
By J C H Stimpson
Attorneys

UNITED STATES PATENT OFFICE.

HOWARD R. HARDENBURG, OF TULSA, AND FREDRICK SAGER, OF TECUMSEH, OKLAHOMA.

POWER-JACK.

No. 927,407.      Specification of Letters Patent.      Patented July 6, 1909.

Application filed September 25, 1908. Serial No. 454,728.

*To all whom it may concern:*

Be it known that we, HOWARD R. HARDENBURG, a citizen of the United States, residing at Tulsa, in the county of Tulsa and State of Oklahoma, and FREDRICK SAGER, a citizen of the United States, residing at Tecumseh, in the county of Pottawatomie and State of Oklahoma, have jointly invented certain new and useful Improvements in Power-Jacks; and we do hereby declare the following to be a full, clear, and exact description of the invention, such as will enable others skilled in the art to which it appertains to make and use the same, reference being had to the accompanying drawings, and to the letters of reference marked thereon, forming part of this specification.

Our invention relates to power jacks, and has for its object the construction of a jack adapted to lift or push great weights.

The features of our invention are hereinafter described and pointed out and are illustrated in the accompanying drawings, in which:

Figure 1 is a side view in elevation of our improved jack with portions of the side broken away. Fig. 2 is a top or plan view thereof with a portion of the frame and main operating lever broken away. Fig. 3 is an end view thereof looking in the direction of the arrow in Fig. 1.

In these drawings A represents a toothed T-shaped ratchet bar adapted to be secured to any stationary object.

B and B' are sections of the jack frame adapted to embrace the upper or toothed flange of the T-shaped ratchet bar A. These sections B B' are secured together by means of bolts or rivets $b$, the upper edges of said sections B B' being preferably semi-circular and having on the peripheries thereof ratchet teeth $b'$, the teeth $b'$ on each side of the apex of said semi-circles hooking toward said apex. Within said sections B and B' of the frame and adjacent to the ratchet bar A passing therethrough I mount on the pivot C an upwardly extending and horizontally oscillating lever D, which has pivoted thereto dogs E E' adapted to engage the teeth $a$ on the bar A. The pivots $e$ of the dogs E and E' are located slightly above and below the line of thrust against the pivot C of the lever D so that a forward oscillation of the lever D operates the lever E' to engage one of the teeth $a$ on the bar A, and the dog E to disengage from another tooth and move forward to come again into positive engagement with a more advanced tooth, and a backward oscillation operates the dog E to engage a tooth on the bar A and draw forward the dog E' to engage a more advanced tooth on the bar A. We preferably provide springs F adapted to press against the dogs E and E', to hold them in engagement with the teeth $a$.

When it is desired to move the frame B B' backward on the tooth-bar A, we provide a lever and link mechanism F' and $f$, and a cam F² for operating the same. This cam F² is provided with a clevis-shaped lever F³ which, when raised, partially rotates the cam F², which causes the lever F to raise the dogs E and E' above the teeth $a$ and permit the jack to be moved backward.

For operating the lever D we provide on the upper end thereof, by means of the pivot $d$, a lever G, and upon each side of said lever G, slightly above and below the thrust line between the pivot $d$ and the teeth on the semi-circular ratchet $b'$ I pivot dogs G' G² and G³ G⁴. When the lever G is oscillated on the pivot $d$, the dogs G' and G² alternately engaging the semi-circular ratchet $b'$, force the lever D forward.

To automatically raise the dogs G' and G² out of engagement and allow the dogs G³ and G⁴ to drop into engagement with the ratchet $b'$, I have mounted on the lever D, upon suitable slides $d'$ $d'$ vertically sliding brackets H and H', and for operating said brackets we pivot an oscillating lever J to the side of the lever D by means of a pivot $j$. The ends of the arms of this lever J are provided with links J' J' extending to the lower ends of the brackets H and H'. On the upper side of the oscillating lever J we provide a segment of gear $j^2$. For operating this lever J and brackets H and H' we pivot upon the side of the lever D a short lever K, the short end of which is provided with a segment of gear adapted to intermesh with the segment of gear $j^2$ on the lever J. To hold the brackets H and H' in an alternately raised and lowered position we place upon the side of the lever D a square stud L, and upon each bracket H and H' we secure a notched or zig-zag spring M adapted to engage the sides of the square stud L, as shown in Fig. 1.

Upon the inside of the section B just under the ratchet $b'$ thereon, we provide shoulders N, upon the faces of which we secure springs $n$, against which springs $n$ the lever K will contact when the lever D is oscillated.

In operation, when it is desired to move the jack forward upon the rack A, the lever G is oscillated upon its pivot $d$, which causes the dogs G' and G² to travel upward on the ratchet $b'$ until they have forced the lever D over far enough to cause the lever K to compress the spring $n$ when the bracket H will be raised and the bracket H' lowered until the angle points on the springs M M are upon the corners of the square stud L, when the spring $n$ will suddenly throw the lever K over and the bracket H will drop and permit the dogs G³ and G⁴ to engage the teeth on the ratchet $b'$ and the bracket H' to simultaneously raise the dogs G' and G² out of engagement therewith, without any ceasing of the oscillation of the lever G. This will cause the lever D to travel backward until the lever K compresses the other spring $n$, when the operation is repeated.

Having thus shown and described our invention so as to enable others to construct and use the same, what we claim as new and desire to secure by Letters Patent is:

1. The combination in a power jack, of a ratchet-bar, a jack-frame slidably mounted thereon, an oscillating lever pivoted to said jack-frame, a pair of dogs pivoted to each side of said lever so as to engage the rack-bar, one of each pair above and one of each pair below the fulcrum of said lever, and means for raising the dogs on one side of the lever out of engagement with the rack bar while the dogs on the opposite side are in engagement therewith, substantially as set forth.

2. The combination in a power-jack, of a ratchet-bar, a jack-frame slidably mounted thereon, a ratchet bar upon the upper edge of said frame, an oscillating lever mounted in said frame upon a pivot, a pair of dogs pivoted to said lever in such a manner that when one dog is engaging a tooth on said ratchet-bar the other dog is moving forward to engage another tooth, an auxiliary lever pivoted upon the free end of said first lever so as to oscillate thereon in the same plane therewith, a pair of dogs pivoted to said auxiliary lever adjacent to the fulcrum thereof, and adapted to operate on the ratchet-bar on said frame each adapted to alternate with the other to exert a forward thrust on the pivot of said auxiliary lever when the same is oscillated, and another pair of dogs pivoted to said auxiliary lever on the opposite side of and adapted to operate upon the ratchet-bar on the frame in the same manner as the first mentioned pair of dogs, and means adapted to automatically raise one pair of dogs out of and drop the other pair of dogs into engagement with the ratchet-bar on the frame, substantially as shown and described.

3. The combination in a power jack, of a T-shaped ratchet-bar, a jack-frame slidably mounted on and embracing the upper flange thereof, a semi-circular ratchet upon the upper edge of said frame, an oscillating main lever pivoted in said frame adjacent to said ratchet-bar, means on said lever adjacent to the fulcrum thereof adapted to engage said ratchet-bar and force said frame forward thereon when said lever is oscillated, an auxiliary lever pivoted to the free end of said main lever, a pair of dogs pivoted to said auxiliary lever adjacent to the fulcrum thereof adapted to engage said semi-circular ratchet and cause said main lever to move toward one end of said frame when said auxiliary lever is oscillated, another pair of dogs pivoted to the opposite side of said auxiliary lever adjacent to the fulcrum thereof and adapted to engage the semi-circular ratchet on the opposite side of said main lever and force the same to travel toward the opposite side of said frame, and vertically slidable brackets mounted on said main lever adapted to alternately raise and lower said opposing pairs of dogs as said main lever reaches the end of each oscillation, means to hold said brackets steady in each alternate position, rock lever and link mechanism to insure perfect alternation between said brackets, and means adapted to cause said sliding bracket on the side of the main lever toward which said lever is moving to drop and the opposite bracket to rise, when said lever has reached the end of its traverse in that direction, substantially as shown and described.

4. The combination in a power jack of a T-shaped ratchet bar, a jack frame slidably mounted on and embracing the upper flange thereof, a semi-circular ratchet upon the upper edge of said frame, an oscillating main lever pivoted in said frame adjacent to said ratchet-bar, means on said lever adjacent to the fulcrum thereof adapted to engage said ratchet-bar and force said frame forward thereon when said lever is oscillated, an auxiliary lever pivoted to the free end of said main lever, a pair of dogs pivoted to one side of said lever adjacent to the fulcrum thereof adapted to engage said semi-circular ratchet and cause said main lever to move toward one end of said frame when said auxiliary lever is oscillated, another pair of dogs pivoted to the opposite side of said auxiliary lever adjacent to the fulcrum thereof and adapted to engage said semi-circular ratchet on the opposite side of said main lever and force the same to travel toward the opposite side of said frame when said auxiliary lever is oscillated, and vertically slidable brackets mounted on said main lever adapted to alternately raise and lower said opposing pairs of dogs as said main lever reaches the end of each oscillation, means to hold said brackets steady in each position, rock-lever and link mechanism adapted to insure perfect alternation between said brackets, gear-teeth on said rock-lever adjacent to the fulcrum thereof, an operating lever pivoted to said main lever, gear teeth on the short end thereof adapted to intermesh with the gear-teeth on said rock-lever, spring-stops on said jack-frame adapted to be compressed by said operating lever and to operate the same as the main lever reaches the end of each oscillation, and means to hold said brackets steady in each alternate position, substantially as shown and described.

In testimony whereof we have affixed our signatures in the presence of two witnesses.

HOWARD R. HARDENBURG.
FREDRICK SAGER.

Witnesses:
CHAS. W. GRIMES,
OSCAR M. LANCASTER.